United States Patent
Heo et al.

(10) Patent No.: US 8,838,113 B2
(45) Date of Patent: Sep. 16, 2014

(54) METHOD AND APPARATUS FOR OPEN LOOP POWER CONTROL IN FREQUENCY DIVISION MULTIPLE ACCESS SYSTEM

(75) Inventors: Youn-Hyoung Heo, Suwon-si (KR); Ju-Ho Lee, Suwon-si (KR); Hwan-Joon Kwon, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 1155 days.

(21) Appl. No.: 11/656,276

(22) Filed: Jan. 22, 2007

(65) Prior Publication Data
US 2007/0189234 A1 Aug. 16, 2007

(30) Foreign Application Priority Data
Jan. 20, 2006 (KR) .................. 10-2006-0006507

(51) Int. Cl.
H04B 7/00 (2006.01)
H04B 7/185 (2006.01)
H04W 52/24 (2009.01)
H04W 52/10 (2009.01)
H04W 52/14 (2009.01)

(52) U.S. Cl.
CPC ............ *H04W 52/10* (2013.01); *H04W 52/243* (2013.01); *H04W 52/242* (2013.01); *Y02B 60/50* (2013.01); *H04W 52/241* (2013.01); *H04W 52/146* (2013.01)
USPC .............................. 455/438; 455/522; 370/318

(58) Field of Classification Search
USPC ............ 455/522, 500, 507, 517, 63.1, 69, 39, 455/501, 67.11, 67.13, 212, 13.4, 442–444, 455/450–453; 370/328–332, 335, 341; 375/227
See application file for complete search history.

(56) References Cited

U.S. PATENT DOCUMENTS

| | | | |
|---|---|---|---|
| 5,666,356 A | 9/1997 | Fleming et al. | |
| 6,603,797 B1 | 8/2003 | Zeira et al. | |
| 6,615,044 B2 * | 9/2003 | Tigerstedt et al. | 455/437 |
| 2002/0077138 A1 * | 6/2002 | Bark et al. | 455/522 |
| 2005/0272426 A1 | 12/2005 | Yang et al. | |
| 2006/0245397 A1 * | 11/2006 | Zhang | 370/335 |
| 2009/0016278 A1 * | 1/2009 | Wakabayashi | 370/329 |

FOREIGN PATENT DOCUMENTS

| | | |
|---|---|---|
| CN | 1350730 | 5/2002 |
| EP | 1 517 456 | 3/2005 |
| EP | 1 530 304 | 5/2005 |
| EP | 1775977 A1 * | 4/2007 |

(Continued)

OTHER PUBLICATIONS

3GPP TSG RAN WG1 #37R1-040492 Montreal, Canada, May 10-14, 2004.*

(Continued)

*Primary Examiner* — Nizar Sivji
(74) *Attorney, Agent, or Firm* — The Farrell Law Firm, P.C.

(57) ABSTRACT

A method and apparatus for efficient open loop power control in a packet data mobile communication system using Frequency Division Multiple Access (FDMA) is provided. The method includes receiving pilot signals from a scheduling cell that schedules a mobile station and neighboring cells located adjacent to the mobile station; calculating a number of neighboring cells having pathlosses that are less than a threshold; calculating a target Signal-to-Interference Ratio (SIR) of the mobile station using the number of neighboring cells having pathlosses that are less than the threshold; measuring a pathloss of the scheduling cell and calculating uplink transmission power using the measured pathloss of the scheduling cell and the calculated target SIR; and transmitting data with the calculated transmission power.

14 Claims, 8 Drawing Sheets

(56) References Cited

FOREIGN PATENT DOCUMENTS

| | | |
|---|---|---|
| JP | 10-510695 | 10/1998 |
| JP | 2002-539707 | 11/2002 |
| KR | 1020000002011 | 1/2000 |
| KR | 1020010008704 | 2/2001 |
| KR | 1020010113744 | 12/2001 |
| WO | WO 98/59433 | 12/1998 |
| WO | WO 2005/006587 | 1/2005 |

OTHER PUBLICATIONS

3GPP TSG RAN WG1 #37 R1-040492 (hereinafter 3GPP).*

* cited by examiner

METHOD AND APPARATUS FOR OPEN LOOP POWER CONTROL IN FREQUENCY DIVISION MULTIPLE ACCESS SYSTEM

PRIORITY

This application claims priority under 35 U.S.C. §119(a) to an application filed in the Korean Intellectual Property Office on Jan. 20, 2006 and assigned Serial No. 2006-6507, the entire disclosure of which is incorporated herein by reference.

BACKGROUND OF THE INVENTION

1. Field of the Invention

The present invention generally relates to a packet data mobile communication system using Frequency Division Multiple Access (FDMA), and in particular, to a method and apparatus for efficient open loop power control.

2. Description of the Related Art

Uplink multiple access schemes that have been recently used in mobile communication systems can be roughly divided into non-orthogonal multiple access scheme and orthogonal multiple access scheme. The non-orthogonal multiple access scheme as the name implies is a multiple access scheme, such as Code Division Multiple Access (CDMA), in which uplink signals transmitted from a plurality of mobile stations are not orthogonal to each other. The orthogonal multiple access scheme is also a multiple access scheme, such as Frequency Division Multiple Access (FDMA) or Time Division Multiple Access (TDMA), in which uplink signals transmitted from a plurality of mobile stations are orthogonal to each other. A general packet data mobile communication system employs a combination of FDMA and TDMA as the orthogonal multiple access scheme. In other words, transmissions of multiple users are distinguished in terms of both frequency and time. In the following description, the combination of FDMA and TDMA will be referred to as FDMA. Orthogonal Frequency Division Multiple Access (OFDMA) and Single Carrier Frequency Division Multiple Access (SC-FDMA) are subsets of FDMA. In these FDMA techniques, a plurality of mobile stations transmit signals using different sub-carriers in order to allow the signals from the different mobile stations to be distinguished from one another.

Figure 1:
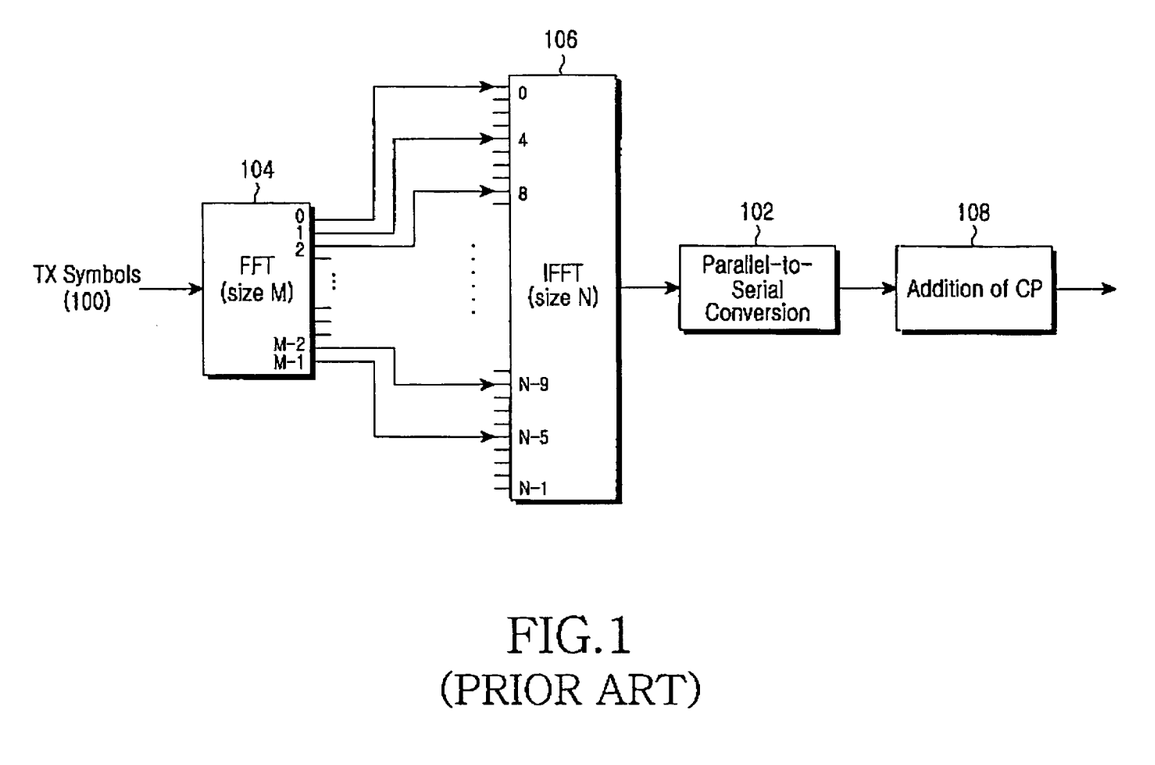
FIG. 1 is a block diagram of a transmitter of a Frequency Division Multiple Access (FDMA)-based system.

A transmitter using Interleaved Frequency Division Multiple Access (IFDMA) that is an example of SC-FDMA will be described with reference to FIG. 1. FIG. 1 illustrates the structure of an IFDMA transmitter.

Although the IFDMA transmitter is implemented using Fast Fourier Transform (FFT) and Inverse Fast Fourier Transform (IFFT) in FIG. 1, it can also be implemented differently. However, the implementation using FFT and IFFT as illustrated in FIG. 1 can facilitate easy change of IFDMA system parameters without complex hardware architecture.

OFDMA and IFDMA may have the following differences in terms of transmitter structure. In addition to an IFFT unit 106 used for multiple sub-carrier transmission, the IFDMA transmitter includes an FFT unit 104 located before IFFT unit 106. Transmission modulation (TX) symbols 100 are input to FFT unit 104 block by block. Signals output from FFT unit 104 are input to IFFT unit 106 at equal intervals, so that IFDMA transmission signal elements are transmitted in the frequency domain by sub-carriers of equal intervals. In this process, it is usual for the input/output size N of IFFT unit 106 to be greater than that of the input/output size M of FFT unit 104.

In the OFDMA transmitter, TX symbols 100 are directly input to IFFT unit 106 without passing through FFT unit 104 and are then transmitted by multiple sub-carriers, thereby generating a large Packet to Average Power Ratio (PAPR). However, in the IFMDA transmitter, even though TX symbols 100 are finally processed by IFFT unit 106 before being transmitted by multiple carriers, they are pre-processed by FFT unit 104 before being processed by IFFT unit 106. Due to the counterbalancing between FFT unit 104 and IFFT unit 106, the pre-processing of TX symbols 100 makes it possible to have an effect similar to that acquired when the output signals of IFFT unit 106 are transmitted by a single sub-carrier, thereby achieving a low PAPR. Finally, the outputs of IFFT unit 106 are converted to a serial stream by a Parallel-to-Serial Converter (PSC) 102. Before the serial stream is transmitted, a Cyclic Prefix (CP) is added to the serial stream as it is in the OFDMA system, thereby preventing interference between multi-path channel signal components.

Figure 2:
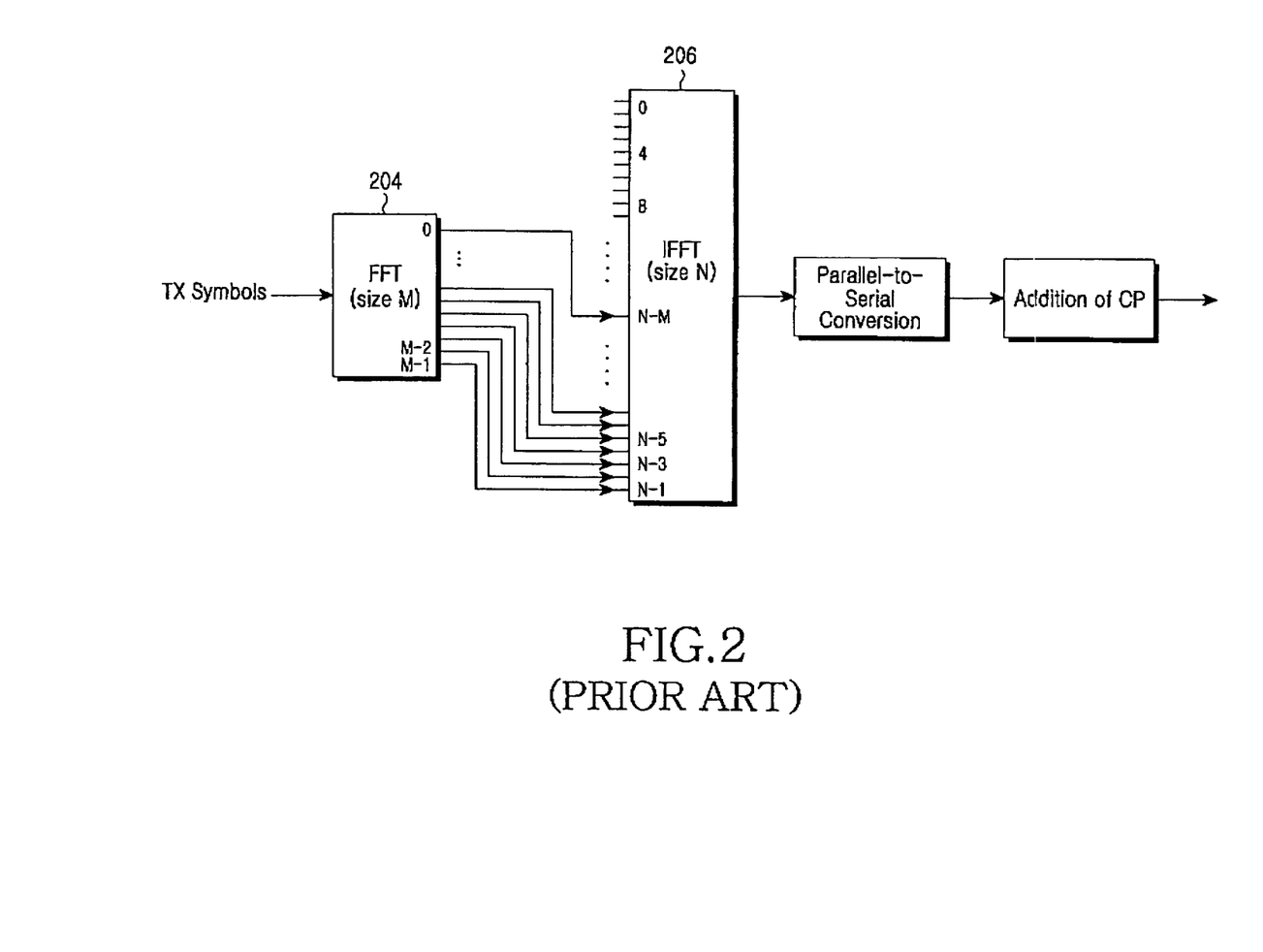
FIG. 2 is a block diagram of a transmitter using a Localized Frequency Division Multiple Access (LFDMA) technique.

FIG. 2 is a block diagram of a transmitter using a Localized Frequency Division Multiple Access (LFDMA) technique, which is similar to the IFDMA technique. The LFDMA technique guarantees the orthogonality between multiple access users and is based on single carrier transmission, thereby achieving a PAPR lower than that of the OFDMA technique.

As illustrated in FIGS. 1 and 2, the difference between LFDMA and IFDMA in view of the transmitter structure is that the outputs of an FFT unit 204 turn into inputs to an IFFT unit 206, which have sequential indices following the last index of the FFT unit 204. In the frequency domain, LFDMA signals occupy the band substituted by adjacent sub-carriers used when the outputs of FFT unit 204 are mapped to the inputs of IFFT unit 206. In other words, IFDMA signals occupy sub-carrier bands (sub-bands) distributed at equal intervals and the LFDMA signals occupy the sub-band constituted by adjacent sub-carriers.

In a general uplink mobile communication system, a base station can support high system capacity with limited radio resources through channel selective scheduling. "Uplink" means transmission from a mobile station to the base station. "Channel selective scheduling" is a technique for allocating a time interval or a frequency interval having a good channel condition to a channel that changes on a time axis or a frequency axis so as to improve system capacity.

Figure 3:
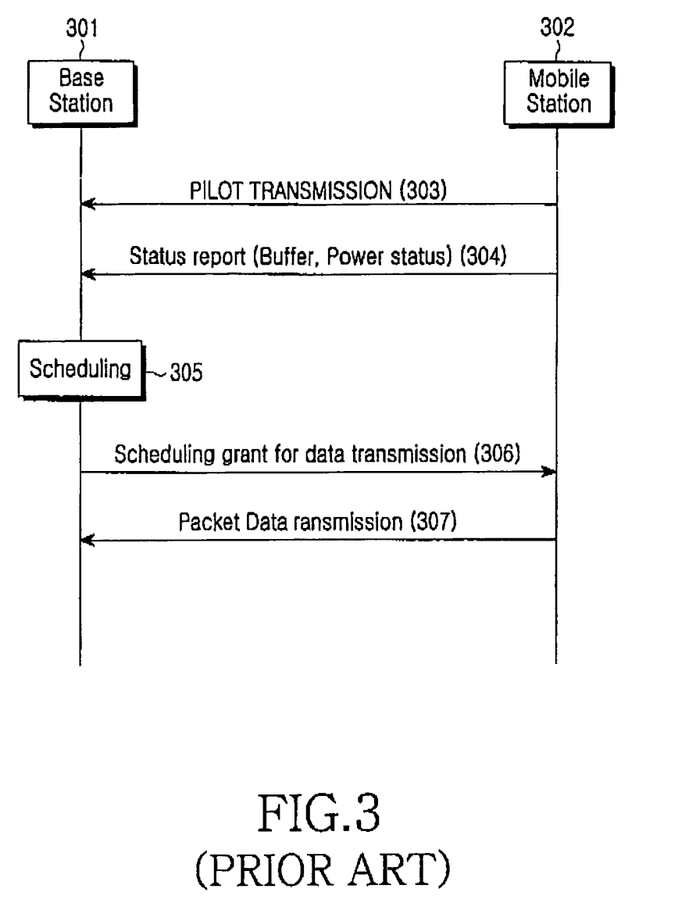
FIG. 3 is a scheduling flow diagram of a process in the FDMA-based system.

FIG. 3 is a scheduling flow diagram on the time axis.

Referring to FIG. 3, a Mobile Station (MS) 302 transmits a pilot signal to a Base Station (BS) 301 in step 303 to be scheduled for data transmission. BS 301 recognizes the channel status of MS 302 based on the received pilot and determines whether to schedule data transmission. When BS 301 determines to schedule data transmission, it determines an appropriate modulation method and a coding rate. In step 304, MS 302 reports its status to BS 301. The status means a buffer status or a power status that the MS desires to transmit. The buffer status information may be the amount of packet data or a service priority of packet data, and the power status information may be the possible amount of transmission power. BS 301 performs scheduling based on the status information and pilot information in step 305. When MS 302 is scheduled, BS 301 transmits a scheduling grant for data transmission to MS 302 in step 306. MS 302 having received the scheduling grant transmits packet data to BS 301 in step 307.

In the aforementioned general scheduling process, an MS may transmit power information to a BS according to a transmission power setting algorithm or may not transmit the power information. In other words, a BS can know the allowable maximum data rate only when the MS transmits power headroom information to the BS in a system that uses closed loop power control; but in a system using open loop power control, the BS can recognize the allowable maximum data rate only with a Signal-to-Interference Ratio (SIR) of a pilot signal received from the MS without reception of power information from the MS.

In a system based on FDMA of orthogonal multiple access type, an MS in a cell is granted orthogonal resources and thus MSs in the cell do not interfere with one another, thereby reducing the need for closed loop power control that is essential for non-orthogonal multiple access. Moreover, closed loop power control requires feedback information for power control. For these reasons, a system that desires to adopt FDMA prefers open loop power control over closed loop power control to control the transmission power of an MS in consideration of signaling overhead.

A method for open loop power control will now be described.

A representative method for open loop power control is as Equation (1):

$$P_{TX} = L_{pilot} + I_{BTS} + SIR_{TARGET} \quad (1),$$

where $P_{TX}$ is a transmission power level (dBm) of a Dedicated Physical Channel (DPCH), $L_{pilot}$ is a pathloss (dB) that is estimated using the measurement of a pilot channel and the signaled transmission power of a pilot channel, $I_{BTS}$ is an interference level (dB) a receiver of the BS experiences, and $SIR_{TARGET}$ is a target SIR (dB) for maintaining the transmission quality of each MS. $SIR_{TARGET}$ may be signaled separately for each MS or collectively for MSs.

When data is transmitted after the transmission power is set as described above, the receiver of the BS can receive a target SIR. However, a fading channel is not considered in Equation (1) and thus the actual reception SIR may not perfectly match with the target SIR due to the fading channel.

The relationship between a target SIR and scheduling will now be described.

Packet scheduling is intended to efficiently grant radio resources of a cell based on the buffer status and power status of an MS. With support for open loop power control, the power status of the MS is determined by the actual reception SIR of a pilot channel. For example, when a reception SIR of a pilot channel, which is transmitted from the MS, is 3 dB, a BS grants [16-Quadrature Amplitude Modulation (QAM), ⅓] as a Modulation Coding Selection (MCS) level for satisfying transmission quality to the MS. For a reception SIR of 0 dB, the BS grants [Quadrature Phase Shift Keying (QPSK), ⅓], which is lower than [16-Quadrature Amplitude Modulation (QAM), ⅓], to the MS. As a result, the MS having a high target SIR also has a high reception SIR and thus a BS scheduler is likely to grant more radio resources to the MS. However, when the highest target SIR is set for all MSs, transmission power increases, thus increasing interference with other cells in the uplink direction. On the other hand, when a low target SIR is set for all MSs, the MS has to transmit much data and may not be properly scheduled even with sufficient transmission power. For these reasons, in the application of open loop power control to packet transmission, it is more desirable to set different target SIRs separately for MSs based on individual conditions of the MSs than to set the same target SIR collectively for the MSs. However, in case of different target SIRs for MSs, when a target SIR is signaled to each MS using upper signaling, frequent signaling is not possible due to signaling overhead, thus making frequent setting of a target SIR difficult. Moreover, when an MS moves, accurate setting of a target SIR is not possible. Therefore, there is a need for a new method for open loop power control in order to efficiently change a target SIR without upper signaling overhead when an MS located adjacent to a BS initially transmits a packet.

SUMMARY OF THE INVENTION

An object of the present invention is to address at least the above problems and/or disadvantages and to provide at least the advantages described below. Accordingly, an object of the present invention is to provide a method for open loop power control for a Frequency Division Multiple Access (FDMA)-based wireless communication system, which increases the entire system capacity and reduces interference.

Another object of the present invention is to provide a method for open loop power control for an FDMA-based wireless communication system, which considers interference with neighboring cells, which is induced by an MS, in setting of a target SIR.

Another object of the present invention is to provide a method of setting transmission power and a transmitter during uplink data transmission of an MS.

According to one aspect of the present invention, there is provided a method for open loop power control in a communication system. The method includes receiving pilot signals from a scheduling cell that schedules a mobile station, and neighboring cells located adjacent to the mobile station, calculating the number of neighboring cells having pathlosses that are less than a predetermined threshold, calculating a target Signal-to-Interference Ratio (SIR) of the mobile station using the number of neighboring cells having pathlosses that are less than the threshold, measuring the pathloss of the scheduling cell and calculating uplink transmission power using the measured pathloss of the scheduling cell and the calculated target SIR, and transmitting data with the calculated transmission power.

According to another aspect of the present invention, there is provided a mobile station for controlling power using open loop power control in a communication system. The mobile station includes a neighboring cell pilot channel receiver, a neighboring cell controller, a scheduling cell pilot channel receiver, an uplink transmission power controller and a data channel transmitter. The neighboring cell pilot channel receiver receives the pilots of neighboring cells located adjacent to the mobile station to measure the reception powers of the neighboring cells. The neighboring cell controller calculates the pathlosses of the neighboring cells from the reception powers that are measured by the neighboring cell pilot channel receiver and calculates the number of neighboring cells having pathlosses that are less than a predetermined threshold. The scheduling cell pilot channel receiver receives the pilot of a scheduling cell that schedules the mobile station to measure the pathloss of the scheduling cell. The uplink transmission power controller calculates a target Signal-to-Interference Ratio (SIR) using the number of neighboring cells having pathlosses that are less than the threshold, which is input from the neighboring cell controller, and calculates uplink transmission power using the target SIR and the pathloss of the scheduling cell, which is input from the scheduling cell pilot channel receiver, and the data channel transmitter transmits data with the uplink transmission power calculated by the uplink transmission power controller.

According to another aspect of the present invention, there is provided a method for open loop power control in a communication system. The method includes receiving pilot signals from a scheduling cell that schedules a mobile station and neighboring cells located adjacent to the mobile station; calculating the pathlosses of the neighboring cells by measuring the powers of the pilots of the neighboring cells, calculating the pathloss of the scheduling cell by measuring the power of the pilot of the scheduling cell, calculating a target Signal-to-Interference Ratio (SIR) of the mobile station using the pathlosses of the neighboring cells and the pathloss of the scheduling cell, and transmitting data with the calculated transmission power.

According to another aspect of the present invention, there is provided a mobile station for controlling power using open loop power control in a communication system. The mobile station includes a neighboring cell pilot channel receiver, a neighboring cell controller, a scheduling cell pilot channel receiver, an uplink transmission power controller and a data channel transmitter. The neighboring cell pilot channel receiver receives the pilots of neighboring cells located adjacent to the mobile station to measure the reception powers of the neighboring cells. The neighboring cell controller calculates the pathlosses of the neighboring cells from the reception powers that are measured by the neighboring cell pilot channel receiver. The scheduling cell pilot channel receiver receives the pilot of a scheduling cell that schedules the mobile station to measure the pathloss of the scheduling cell. The uplink transmission power controller calculates a target Signal-to-Interference Ratio (SIR) using the pathloss of the scheduling cell, which is input from the scheduling cell pilot channel receiver, and the pathlosses of the neighboring cells, which are input from the neighboring cell controller, and calculating uplink transmission power using the target SIR and the pathloss of the scheduling cell, and the data channel transmitter transmits data with the uplink transmission power calculated by the uplink transmission power controller.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF PREFERRED EMBODIMENTS

The matters defined in the description such as detailed construction and elements are provided to assist in a comprehensive understanding of the invention. Accordingly, those of ordinary skill in the art will recognize that various changes and modifications of the embodiment described herein can be made without departing from the scope and spirit of the invention. Also, descriptions of well-known functions and constructions are omitted for clarity and conciseness. The following terms are defined in consideration of functions in the present invention. Therefore, their definition should be based on the overall contents of the specification.

The present invention provides a method of efficiently setting a target Signal-to-Interference Ratio (SIR) in a Frequency Division Multiple Access (FDMA)-based uplink system when a Mobile Station (MS) determines transmission power using open loop power control. The target SIR means one of setting parameters, except for a measured pathloss, which are used for the MS to determine transmission power.

The distinctive feature of the present invention is that an MS sets a target SIR by considering the SIR set by a network and its location with respect to neighboring cells and the target SIR is calculated as an appropriate target SIR using an internal algorithm of the MS.

As discussed previously, in a system that supports open loop power control, a Base Station (BS) scheduler can recognize the power status of an MS through a reception SIR of a pilot channel of the MS and thus the reception SIR has to be improved in order for the MS to be granted high data rate. A target SIR of the MS has to be also raised to increase the reception SIR. However, an increase in the transmission power of the MS with a high target SIR may also increase interference with neighboring cells located adjacent to the MS. For this reason, it is not desirable to raise target SIRs for all MSs in a cell. Therefore, in the present invention, an MS sets a target SIR based on the adjacency of neighboring cells. In other words, the present invention lowers a target SIR for an MS that is located around a cell boundary and thus has a large influence upon other cells.

Figure 4:
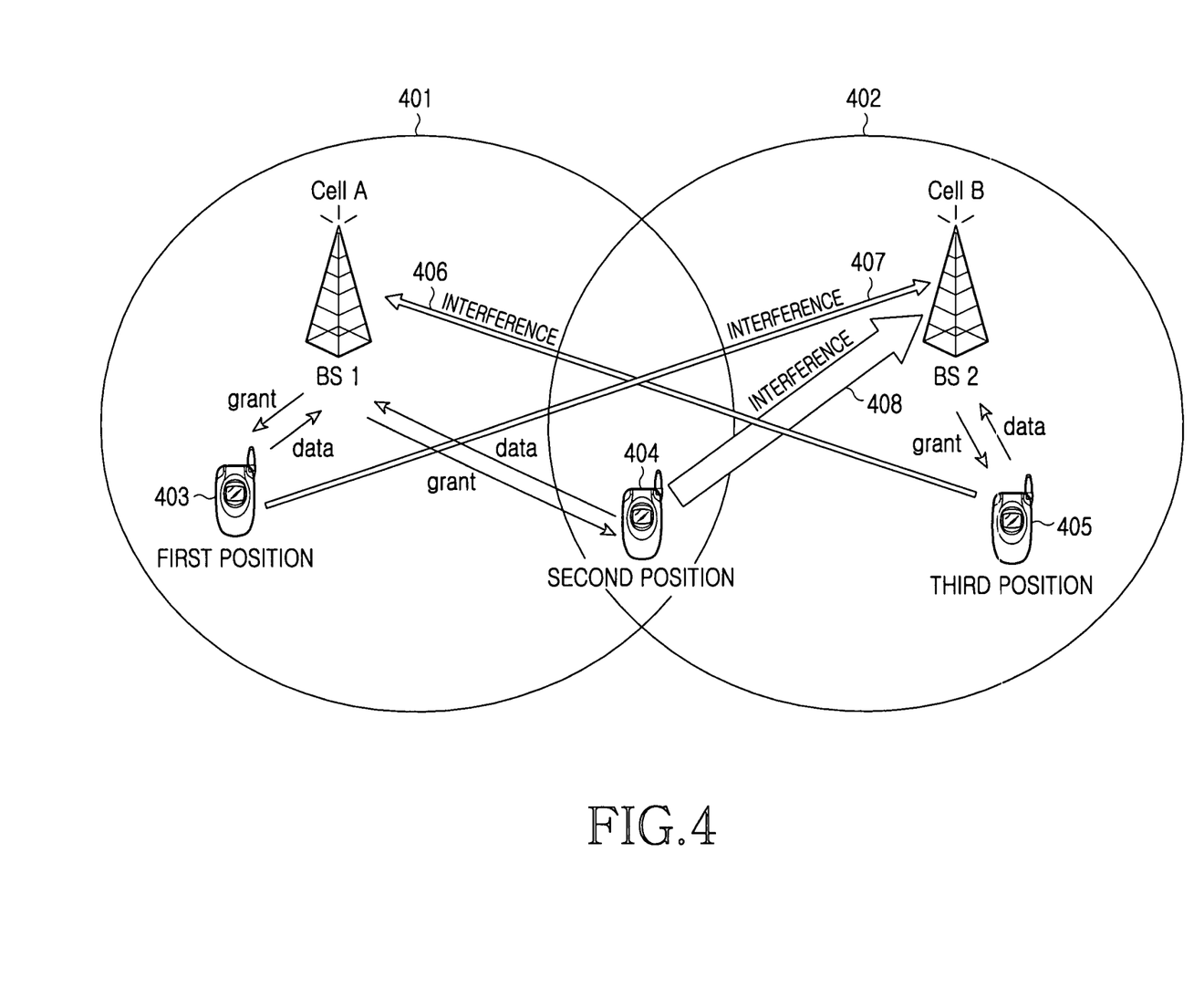
FIG. 4 illustrates interference induced by a Mobile Station (MS) around a cell boundary.

As illustrated in FIG. 4, when an MS is located in a first position 403, it is granted radio resources from a BS 1 and transmits packet data to the BS 1. In this case, since the MS is located adjacent to the BS 1 and distant from a BS 2, interference 407 with the BS 2 is small. Thus, a target SIR for the MS is set high to allow a cell A 401 to grant high data rate to the MS.

When the MS moves to a second position 404, it is scheduled by BS 1 in cell A 401 and transmits packet data to BS 1. However, since the MS is located adjacent to not only BS 1 but also BS 2 as illustrated in FIG. 4, interference 408 with BS 2 is increased in comparison to when the MS is located in the first position 403. Such an increase in interference reduces the capacity of a cell B 402. In this case, a target SIR of the MS is lowered in order to reduce interference 408 with cell B 402.

When the MS moves to a third position 405, the MS changes a scheduling BS from BS 1 to BS 2 through a procedure such as handoff, fast cell selection, and the like. In other words, the MS is granted radio resources from BS 1 and transmits packet data to BS 2. In this case, the MS is distant from BS 1 and thus its interference 406 with BS 1 is reduced. Therefore, the MS sets a target SIR high in order to improve efficiency in the use of radio resources.

As mentioned previously, such target SIR setting may be performed through upper signaling, causing signal overhead. Moreover, when a cell change occurs only by physical layer signaling such as fast cell selection, there is no way to signal a target SIR.

Therefore, the present invention provides a method of setting a target SIR, by which an MS determines the presence of a neighboring cell and measures the pilot power of the neighboring cell in order to set the target SIR to a value that maximizes the scheduling efficiency of a BS and minimizes interference with a neighboring BS.

In a first exemplary embodiment of the present invention, a target SIR $SIR_{target}$ is set using the number of neighboring cells as Equation (2):

$$SIR_{target} = \max(SIR_{max} - \Delta_{off} N_{nc}, SIR_{min}) \quad (2),$$

where $SIR_{max}$, as a reference SIR, is set as a target SIR for an MS if there is no neighboring cell, and may be signaled from a network separately for each MS or collectively for all MSs in a cell or may be predefined, and $N_{nc}$, as a factor indicating the number of neighboring cells, may be known through neighboring cell information signaled to the MS from the network or may be determined by MS's measurement.

For the determination of $N_{nc}$ through MS's measurement, the MS measures the pilots of neighboring cells included in neighboring cell list information signaled from the network. The MS then calculates pathlosses of the neighboring cells using reception Signal-to-Noise Ratios (SNRs) or transmission powers of the pilots. The MS counts neighboring cells having pathlosses that are less than a predetermined threshold, thereby determining $N_{nc}$. The threshold may be a value that is signaled separately for each MS or collectively for the MSs in a cell or is predefined in a specification. If the pathloss of a neighboring cell is less than the threshold, it means that the MS is located adjacent to the neighboring cell and thus may induce large interference with the neighboring cell. In this case, a target SIR for the MS is lowered in order to reduce the transmission power of the MS according to the present invention.

$\Delta_{off}$ determines the reduction from the reference SIR and the target SIR is lowered by $\Delta_{off} \cdot N_{nc}$. $\Delta_{off}$ may be signaled from the network based on interference and loading from neighboring cells or may be predefined as a constant in a specification. In order to prevent supportable data rate from being excessively reduced due to transmission power reduction caused by excessive lowering of a target SIR by $\Delta_{off}$, the minimum value of the target SIR may be limited using $SIR_{min}$. In other words, in Equation (2), for $SIR_{max} - \Delta_{off} N_{nc} < SIR_{min}$, the target SIR is set to $SIR_{min}$ in order to prevent the target SIR from being set to an excessively low value.

Figure 5:
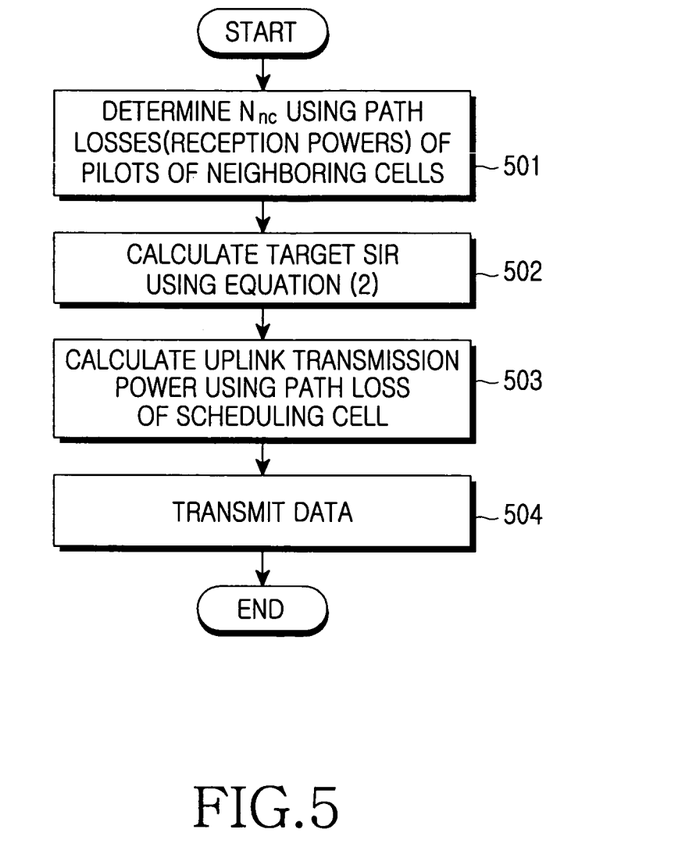
FIG. 5 is a flowchart of a process of setting transmission power of an MS according to the present invention.

Referring to FIG. 5, an MS receives pilot signals from a scheduling cell, which schedules the MS, and neighboring cells, which are located adjacent to the MS, and measures the pilots of the neighboring cells to determine the number $N_{nc}$ of neighboring cells having pathlosses that are less than a predetermined threshold in step 501. In step 502, the MS calculates a target SIR using Equation (2). The MS measures the pathloss of the scheduling cell and calculates uplink transmission power by inserting the pathloss of the scheduling cell and the calculated target SIR into Equation (1) in step 503 and then transmits data in step 504.

Figure 6:
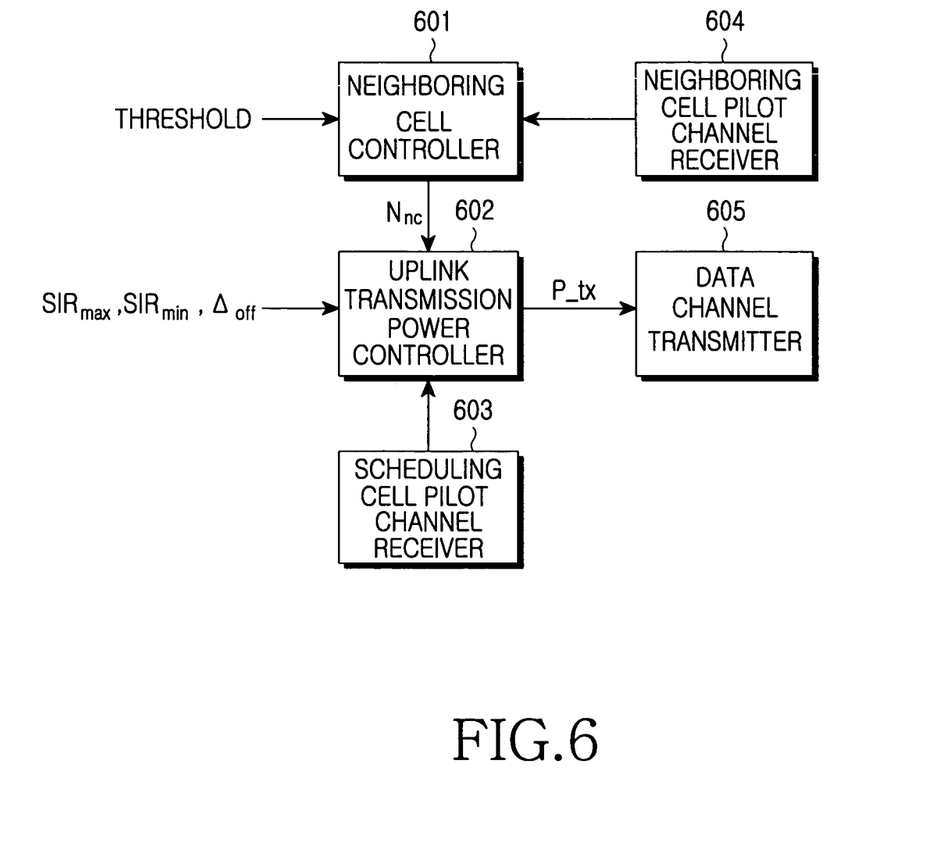
FIG. 6 is a block diagram of a transmitter of an MS according to the present invention.

Referring to FIG. 6, a neighboring cell pilot channel receiver 604 receives the pilots of neighboring cells to measure the reception powers of the neighboring cells. Since the pathlosses of the neighboring cells can be known with the reception powers or transmission powers of pilot channels of the neighboring cells, a neighboring cell controller 601 calculates the number $N_{nc}$ of neighboring cells having pathlosses that are less than a threshold using the pathlosses. The neighboring cell controller 601 then transmits the calculated number of neighboring cells to an uplink transmission power controller 602, and the uplink transmission power controller 602 calculates uplink transmission power P_tx using, for example, Equation (2), according to the present invention. At this time, because of calculating the uplink transmission power using open loop power control, uplink transmission power controller 602 requires the pathloss of the scheduling cell. Thus, a scheduling cell pilot channel receiver 603 receives the pilot channel of the scheduling cell and informs uplink transmission power controller 602 of the pathloss of the scheduling cell. A data channel transmitter 605 transmits data with the transmission power calculated by uplink transmission power controller 602.

According to another aspect of the present invention, an MS sets a target SIR based on a relative difference between a distance between a neighboring cell and the MS and a distance between a scheduling cell and the MS. To this end, the MS measures the pilots of the neighboring cell and the scheduling cell to calculate the path losses or reception powers of the neighboring cell and the scheduling cell and calculates a ratio of the power levels of the neighboring cell and the scheduling cell, thereby setting a target SIR.

When the target SIR is lowered by the number of neighboring cells having pathlosses that are less than a certain threshold, the difference cannot be established between a cell whose pathloss is less than the threshold by a small degree and thus is much different from the pathloss of the scheduling cell and a cell whose pathloss is less than the threshold by a large degree and thus is a little different from the pathloss of the scheduling cell. As a result, it is difficult to finely adjust the target SIR. Therefore, in this case, the target SIR is finely set according to another embodiment of the present invention. Accordingly, the target SIR is set as Equation (3):

$$SIR_{target} = \max\left\{ SIR_{max} - \Delta_{off} \times \frac{PL_{sch}}{\sum_{i=1}^{N_{nc}} PL_i}, SIR_{min} \right\}, \quad (3)$$

where $PL_{sch}$ is the pathloss of the scheduling cell and $PL_i$ is the pathloss of an $i^{th}$ neighboring cell. $PL_i$ is measured by an MS using neighboring cell information transmitted from a network. The MS may use the pathlosses of all cells included in a neighboring cell list transmitted from the network, but only the pathlosses of $N_{nc}$ cells acquired using the threshold as in the first embodiment of the present invention may be used.

According to Equation (3), $SIR_{max}$ is lowered by a ratio of the pathloss of the scheduling cell and a sum of the pathlosses of neighboring cells. To this end, if the rate of the sum of the pathlosses of the neighboring cells in the entire pathloss is high, large $\Delta_{off}$ is applied, but otherwise, small $\Delta_{off}$ is applied. Additionally, with reference to Equation (3), $SIR_{min}$ may be selected if the calculation result is too low to prevent excessive lowering of the target SIR. The MS may also use a ratio of the pathlosses of neighboring cells and the pathloss of the scheduling cell according to the second embodiment of the present invention, as Equation (4):

$$SIR_{target} = \max\left\{ SIR_{max} - \Delta_{off} \times \frac{1}{\min_{N_{nc}}\{PL_{diff}\}}, SIR_{min} \right\}, \quad (4)$$

where $PL_{diff}$ is a difference between the pathlosses of the neighboring cells and the scheduling cell, i.e., $$\left( \sum_{i=1}^{N_{nc}} PL_i - PL_{sch} \right), \text{ and } \min_{N_{nc}}\{PL_{diff}\}$$

is the minimum value among $PL_{diff}$ values.

According to Equation (4), the target SIR is lowered to the minimum value among differences between the pathlosses of the neighboring cells and the scheduling cell by applying $\Delta_{off}$ for lowering the target SIR to each cell. Also in this case, the MS may use the pathlosses of all the cells included in the neighboring cell list transmitted from the network or use only the pathlosses of $N_{nc}$ cells acquired using the threshold as in the first embodiment of the present invention. To prevent excessive lowering of the target SIR also in Equation (4), $SIR_{min}$ may be selected if the calculation result is too low.

Figure 7:
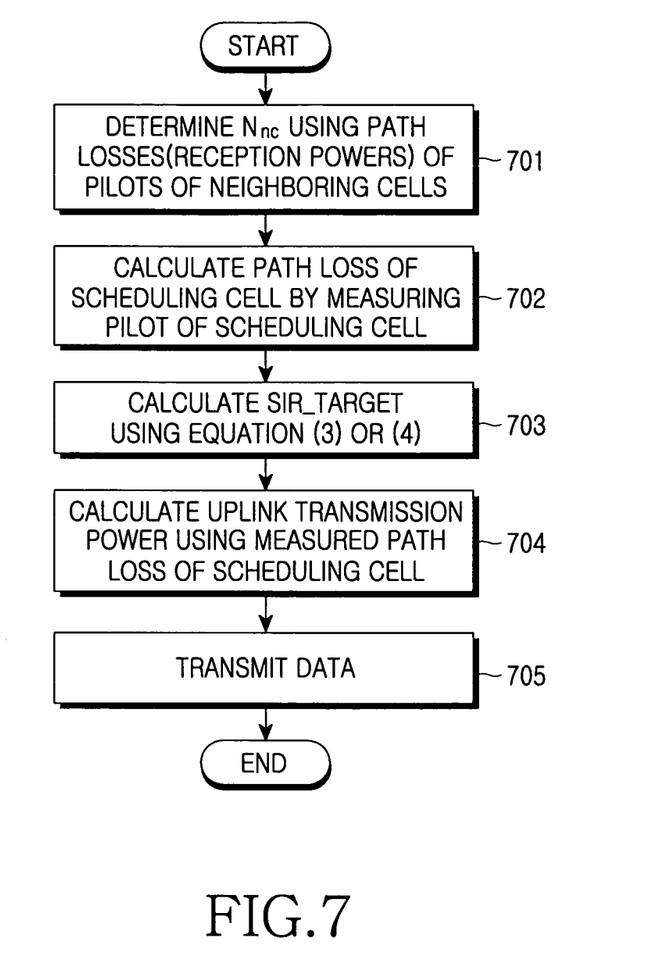
FIG. 7 is a flowchart of a process of setting transmission power of an MS according to another embodiment of the present invention.

As illustrated in FIG. 7, the MS receives pilot signals from the scheduling cell and the neighboring cells and measures the pilots of the neighboring cells to calculate the number $N_{nc}$ of neighboring cells having pathlosses that is less than a threshold in step 701. In step 702, the target SIR is calculated using the pathlosses of the neighboring cells, which is less than the threshold, and the pathloss of the scheduling cell according to Equation (3) or Equation (4). Uplink transmission power is calculated using the pilot pathloss of the scheduling cell and the calculated target SIR according to Equation (1) in step 703 and data is transmitted with the calculated uplink transmission power in step 704.

Figure 8:
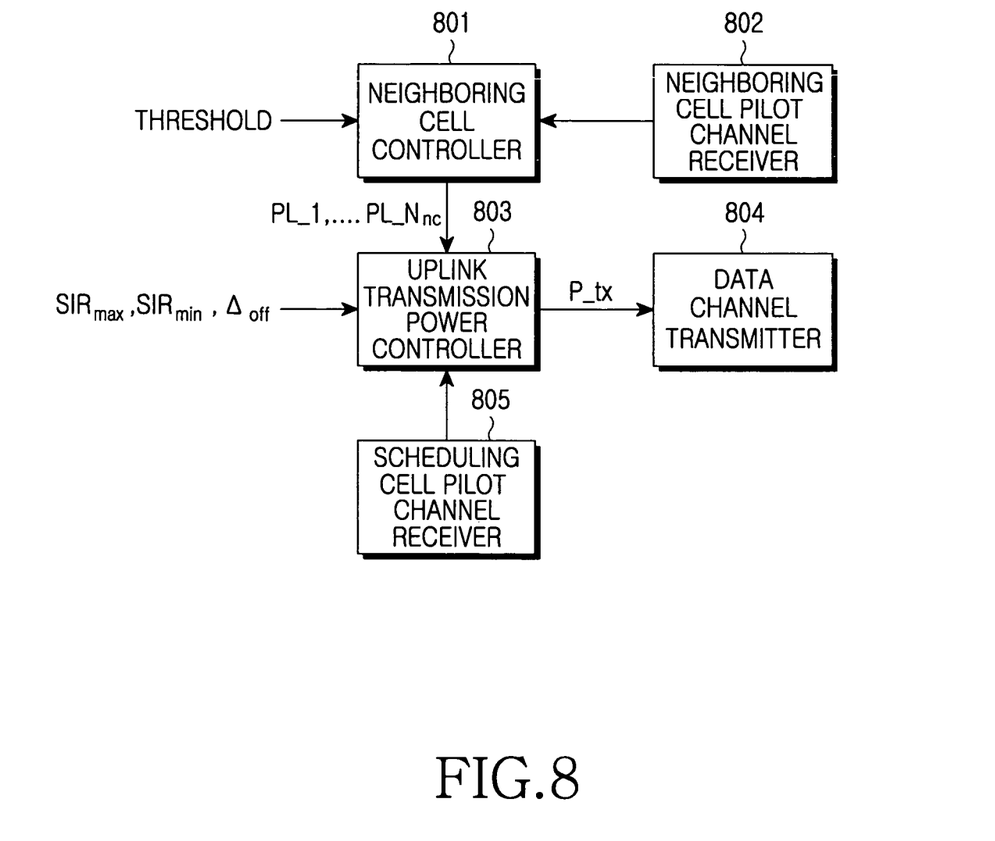
FIG. 8 is a block diagram of a transmitter of an MS according to the second embodiment of the present invention.

Referring to FIG. 8, a neighboring cell pilot channel receiver 802 receives pilots from neighboring cells to measure the reception powers of the neighboring cells. Since the pathlosses of the neighboring cells can be known with the reception powers or transmission powers of pilot channels of the neighboring cells, a neighboring cell controller 801 selects cells having pathlosses that is less than a threshold using the pathlosses. In other words, the neighboring cell controller 801 selects $N_{nc}$ neighboring cells, calculates the pathlosses PL_1, ..., PL_$N_{nc}$, of the neighboring cells, and transmits the pathlosses to an uplink transmission power controller 803.

Because of calculating uplink transmission power using open loop power control, uplink transmission power controller 803 requires pathloss of the scheduling cell. Thus, a scheduling cell pilot channel receiver 805 receives the pilot channel of the scheduling cell and informs the uplink transmission power controller 803 of the pathloss of the scheduling cell. Uplink transmission power controller 803 calculates a target SIR using the pathlosses of the neighboring cells and the pathloss of the scheduling cell according to Equation (3) or Equation (4) and then calculates uplink transmission power P_tx using the calculated target SIR according to Equation (1). A data channel transmitter 804 transmits data with the transmission power calculated by the uplink transmission power controller 803.

As described above, according to the present invention, by adjusting transmission power according to the position of an MS and a relationship between the MS and neighboring cells, support for high data rate can be provided to an MS that is located near a BS and interference induced by an MS that is located around a cell boundary can be minimized. In this way, the entire system capacity can also be improved.

While the present invention has been shown and described with reference to preferred embodiments of the present invention thereof, it will be understood by those skilled in the art that various changes in form and details may be made therein without departing from the spirit and scope of the present invention as further defined by the appended claims and their equivalents.

What is claimed is:

1. A method for open loop power control in a communication system, the method comprising:

receiving pilot signals from a scheduling cell that schedules a mobile station, and neighboring cells located adjacent to the mobile station;

calculating the number of neighboring cells having pathlosses that are less than a threshold;

calculating a target Signal-to-Interference Ratio (SIR) of the mobile station using the number of neighboring cells having pathlosses that are less than the threshold;

measuring the pathloss of the scheduling cell and calculating uplink transmission power using the measured pathloss of the scheduling cell and the calculated target SIR; and transmitting data with the calculated transmission power, wherein the calculation of the target SIR comprises setting a value acquired by lowering a reference SIR by a product of a parameter for determining the amount of lowering from the reference SIR and the number of neighboring cells having pathlosses that are less than the threshold as the target SIR.

2. The method of claim 1, wherein the calculation of the target SIR setting a minimum SIR as the target SIR when the calculated target SIR is less than the minimum SIR.

3. A mobile station for controlling power using open loop power control in a communication system, the mobile station comprising:

a neighboring cell pilot channel receiver for receiving the pilots of neighboring cells located adjacent to the mobile station to measure the reception powers of the neighboring cells;

a neighboring cell controller for calculating the pathlosses of the neighboring cells from the reception powers that are measured by the neighboring cell pilot channel receiver and calculating the number of neighboring cells having pathlosses that are less than a threshold;

a scheduling cell pilot channel receiver for receiving the pilot of a scheduling cell that schedules the mobile station to measure the pathloss of the scheduling cell;

an uplink transmission power controller for calculating a target Signal-to-Interference Ratio (SIR) using the number of neighboring cells having pathlosses that are less than the threshold, which is input from the neighboring cell controller, and calculating uplink transmission power using the target SIR and the pathloss of the scheduling cell, which is input from the scheduling cell pilot channel receiver; and a data channel transmitter for transmitting data with the uplink transmission power calculated by the uplink transmission power controller, wherein the uplink transmission power controller sets a value acquired by lowering a reference SIR by a product of a parameter for determining the amount of lowering from the reference SIR and the number of neighboring cells having pathlosses that are less than the threshold as the target SIR, and wherein the neighboring cell controller calculates the number of neighboring cells having pathlosses that are less than the threshold and the uplink transmission power controller calculates the target SIR using the number of neighboring cells having pathlosses that are less than the threshold, which is received from the neighboring cell controller.

4. The mobile station of claim 3, wherein the uplink transmission power controller sets a minimum SIR as the target SIR when the calculated target SIR is less than the minimum SIR.

5. A method for open loop power control in a communication system, the method comprising:

receiving pilot signals from a scheduling cell that schedules a mobile station, and neighboring cells located adjacent to the mobile station;

calculating the pathlosses of the neighboring cells by measuring the powers of the pilots of the neighboring cells;

calculating the pathloss of the scheduling cell by measuring the power of the pilot of the scheduling cell;

calculating a target Signal-to-Interference Ratio (SIR) of the mobile station using the pathlosses of the neighboring cells and the pathloss of the scheduling cell; and transmitting data with the calculated transmission power, wherein the calculation of the target SIR comprises setting a value acquired by lowering a reference SIR by a ratio of the pathloss of the scheduling cell and a sum of the pathlosses of the neighboring cells as the target SIR.

6. The method of claim 5, wherein the calculation of the target SIR comprises calculating the target SIR only using the pathlosses of the neighboring cells, which are less than a threshold.

7. The method of claim 5, wherein the calculation of the target SIR comprises setting a minimum SIR as the target SIR when the calculated target SIR is less than the minimum SIR.

8. A method for open loop power control in a communication system, the method comprising:

receiving pilot signals from a scheduling cell that schedules a mobile station, and neighboring cells located adjacent to the mobile station;

calculating the pathlosses of the neighboring cells by measuring the powers of the pilots of the neighboring cells;

calculating the pathloss of the scheduling cell by measuring the power of the pilot of the scheduling cell;

calculating a target Signal-to-Interference Ratio (SIR) of the mobile station using the pathlosses of the neighboring cells and the pathloss of the scheduling cell; and transmitting data with the calculated transmission power, wherein the calculation of the target SIR comprises setting a value acquired by lowering a reference SIR by the minimum value among differences between the pathlosses of the neighboring cells and the pathloss of the scheduling cell as the target SIR, and wherein the calculation of the target SIR comprises calculating the target SIR only using the pathlosses of the neighboring cells that are less than a threshold.

9. The method of claim 8, wherein the calculation of the target SIR comprises setting a minimum SIR as the target SIR when the calculated target SIR is less than the minimum SIR.

10. A mobile station for controlling power using open loop power control in a communication system, the mobile station comprising:

a neighboring cell pilot channel receiver for receiving the pilots of neighboring cells located adjacent to the mobile station to measure the reception powers of the neighboring cells;

a neighboring cell controller for calculating the pathlosses of the neighboring cells from the reception powers that are measured by the neighboring cell pilot channel receiver;

a scheduling cell pilot channel receiver for receiving the pilot of a scheduling cell that schedules the mobile station to measure the pathloss of the scheduling cell;

an uplink transmission power controller for calculating a target Signal-to-Interference Ratio (SIR) using the pathloss of the scheduling cell, which is input from the scheduling cell pilot channel receiver, and the pathlosses of the neighboring cells, which are input from the neighboring cell controller, and calculating uplink transmission power using the target SIR and the pathloss of the scheduling cell; and a data channel transmitter for transmitting data with the uplink transmission power calculated by the uplink transmission power controller wherein the uplink transmission power controller sets a value acquired by lowering a reference SIR by a ratio of the pathloss of the scheduling cell and a sum of the pathlosses of the neighboring cells as the target SIR.

11. The mobile station of claim 10, wherein the neighboring cell controller calculates the number of neighboring cells having pathlosses that are less than a threshold and the uplink transmission power controller calculates the target SIR using the number of neighboring cells having pathlosses that are less than the threshold, which is received from the neighboring cell controller.

12. The mobile station of claim 10, wherein the uplink transmission power controller sets a minimum SIR as the target SIR when the calculated target SIR is less than the minimum SIR.

13. A mobile station for controlling power using open loop power control in a communication system, the mobile station comprising:

a neighboring cell pilot channel receiver for receiving the pilots of neighboring cells located adjacent to the mobile station to measure the reception powers of the neighboring cells;

a neighboring cell controller for calculating the pathlosses of the neighboring cells from the reception powers that are measured by the neighboring cell pilot channel receiver;

a scheduling cell pilot channel receiver for receiving the pilot of a scheduling cell that schedules the mobile station to measure the pathloss of the scheduling cell;

an uplink transmission power controller for calculating a target Signal-to-Interference Ratio (SIR) using the pathloss of the scheduling cell, which is input from the scheduling cell pilot channel receiver, and the pathlosses of the neighboring cells, which are input from the neighboring cell controller, and calculating uplink transmission power using the target SIR and the pathloss of the scheduling cell; and a data channel transmitter for transmitting data with the uplink transmission power calculated by the uplink transmission power controller, wherein the uplink transmission power controller sets a value acquired by lowering a reference SIR by the minimum value among differences between the pathlosses of the neighboring cells and the pathloss of the scheduling cell as the target SIR, and wherein the neighboring cell controller calculates the number of neighboring cells having pathlosses that are less than a threshold and the uplink transmission power controller calculates the target SIR using the number of neighboring cells having pathlosses that are less than the threshold, which is received from the neighboring cell controller.

14. The mobile station of claim 13, wherein the uplink transmission power controller sets a minimum SIR as the target SIR when the calculated target SIR is less than the minimum SIR.

* * * * *